United States Patent
Kang et al.

[11] Patent Number: 6,122,070
[45] Date of Patent: Sep. 19, 2000

[54] NON-CASUAL ERROR DIFFUSION METHOD AND APPARATUS

[75] Inventors: Seung Woo Kang, Seoul; Gi Min Kang; Chun Woo Kim, both of Incheonkwangyeok-Si; Hyun Jung Shin, Seoul, all of Rep. of Korea

[73] Assignee: LG Electronics, Inc., Seoul, Rep. of Korea

[21] Appl. No.: 09/035,093

[22] Filed: Mar. 5, 1998

[30] Foreign Application Priority Data

Mar. 6, 1997 [KR] Rep. of Korea ............. 97-7471

[51] Int. Cl.[7] ............................ H04N 1/405
[52] U.S. Cl. ................ 358/1.9; 358/456; 382/252
[58] Field of Search ............................ 382/252, 272, 382/260, 237; 358/445, 447, 534, 535, 429, 1.9, 456, 458, 298

[56] References Cited

U.S. PATENT DOCUMENTS

| | | | |
|---|---|---|---|
| 5,208,684 | 5/1993 | Itoh | 382/279 |
| 5,467,201 | 11/1995 | Fan | 358/447 |
| 5,521,989 | 5/1996 | Fan | 382/252 |
| 5,668,638 | 9/1997 | Knox et al. | 382/272 |
| 5,870,503 | 2/1999 | Kumashiro | 382/252 |

OTHER PUBLICATIONS

IEEE Catalog No.: 97CB36144. Iterative error diffusion halftoning using a zero phase error filter, Authors: Makur, A.; Kumar, A. This paper appeared in: Image Processing, 1997, Proceding., International Conference on pp.: 795–798 vol. 1.

*Primary Examiner*—Scott Rogers
*Assistant Examiner*—Gholam A. Behpour

[57] ABSTRACT

A non-causal error diffusion technique that is capable of gray image signals into binary image signals to prevent the occurrence of visible correlated patterns and/or artifacts. In the non-causal error diffusion method, transformation errors produced when great gray level sets of image signals for a certain pixel are transformed into reduced gray level sets of image signals are reflected to the image signals for pixels at non-causal locations with respect to the certain pixel.

8 Claims, 11 Drawing Sheets

NON-CASUAL ERROR DIFFUSION METHOD AND APPARATUS

BACKGROUND OF THE INVENTION

1. Field of the Invention

This invention relates to a digital halftoning system, and more particularly to a digital halftoning system that iteratively diffuses error to reduce the formation of visible correlated patterns or artifacts.

2. Description of the Prior Art

Digital halftoning converts image information including a large number of gray scaled pixel values to a reduced number of gray scaled pixel values in order that image information be rendered for display or hardcopy (printed) output. Image information, be it color or black and white, is commonly derived by scanning, initially at least, in a gray level format containing a large number of gray density levels, e.g., 256 levels for black and white and more than 16 million ($256^3$) levels for color, which is usually not reproducible on standard printing and display systems. The term "gray level" is used herein to described data for both black and white or color applications. For example, standard printing system print in a limited number of levels, either a spot or a no spot in the binary case, or a limited number of levels associated with the spot, such as four in the quaternary case. Thus, image information encoded by a large number of gray level values must be converted to a fewer number of gray level values in order that the image information be rendered on typical display and printing systems.

Digital halftoning techniques of converting gray level pixel image data to binary level pixel image data as described above may be divided into three categories; dithering, error diffusion, and optimization based methods. The dithering compares gray level values of pixels to be halftoned with a set of preselected thresholds, thereby converting gray level pixel image data to binary level pixel image data. In the error diffusion method, an error generated when a given pixel is binarized, is propagated to its neighboring pixels and reflected when the neighboring pixels are binarized. The optimization based halftoning method establishes a difference between gray level pixel image data and binary level pixel image data as error criterion, and then performs the binarization such that the error criterion is minimized by utilizing optimization techniques such as statistics, neural network, gene algorithm and so on. The present widespread halftoning methods are the dithering and the error diffusion method. The dithering is widely used because of a rapid speed characteristic while the error diffusion is widely used because of an excellent quality characteristic of output binary image.

Basic error diffusion method is proposed by Floyd and Steinberg, in "An Adaptive Algorithm fro Spatial Greyscale", Proceedings of the SID 17/2, 75–77 (1976). Binary level pixel image data obtained through the Floyd-Steinberg's error diffusion method, however, often exhibits undesirable artifacts at certain gray levels. In order to reduce the undesirable artifacts, methods of enhancing the neighboring pixels used upon error diffusion are suggested by Jarvis et al. and Stucki et al. In these methods, the error diffusion technique as taught in "A Survey of Techniques for the Display of Continuous Tone Pictures on Bi-level Displays" by Javis et al., Computer Graphics and Image Processing, Vol. 5., pp. 13–40 (1976) can reduce the artifacts, but has a disadvantage in that much calculation time is required. Alternative error diffusion techniques for reducing artifacts are taught in "Error Diffusion with a More Symmetric Error Distribution" (1994), by Fan, published at IS&T/SPIE Symposium regarding electronic image science and techniques, and in "Edge-enhanced Error Diffusion Method Employing Blue Noise Mask" (1994), by Jang-sik Park et al., published at the 7th Workshop regarding image processing and understanding. In these methods, new locations and coefficient values has been suggested for neighboring pixels that are to experience the error propagation. In addition to these methods, an attempt for the edge enhancement in binarized image is taught in "New Edge-enhanced Error Diffusion algorithm Based On the Error Sum Criterion", Electronic Image Journal (1995), by Jae-ho Kim.

However, when a certain pixel is binarized, all the above methods reflect only causal errors propagated from the previously quantized pixels in surrounding pixels of the certain pixel. The causal errors are errors generated from pixels located in the left and upper sides of a pixel to be quantized as the quantization is progressed from the left side into the right side and from the upper side into the lower side. On the other hand, non-causal errors contrary to the causal errors is errors to be produced upon quantization for pixels located in the right and lower sides of the pixel to be quantized. For example, Floyd-Steinberg's error diffusion method, Zhigang Fan's first error diffusion method, Zhigang Fan's second error diffusion method, Jang-sik Park's error diffusion method, Stucki's error diffusion method and Jarvis's error diffusion method, as shown in FIG. 1(A) to FIG. 1(F), respectively, reflect only causal errors propagated from pixels located in the left and upper sides of a certain pixel when the certain pixel is quantized. In other words, any causal errors are not reflected in a certain pixel binarized by the conventional error diffusion techniques. This results from a visible correlated patterns and/or artifacts exhibiting in binary level pixel image binarized using the conventional error diffusion pixels.

SUMMARY OF THE INVENTION

Accordingly, it is an object of the present invention to provide a non-causal error diffusion method and apparatus that is capable of converting gray image signals into binary image signals in order to prevent the occurrence of visible correlated patterns and/or artifacts.

In order to achieve the above and other objects of the invention, according to one aspect of the present invention there is provided a non-causal error diffusion method wherein, in transforming digital image of great gray level sets into digital image of reduced gray level sets, transformation errors in a certain pixel are reflected to pixel data for pixels at non-causal locations that are adjacent to the certain pixel.

According to another aspect of the present invention there is provided a non-causal error diffusion method wherein, in transforming digital image of great gray level sets into digital image of reduced gray level sets, the method comprises the steps of calculating non-causal transformation errors for each pixel at non-causal locations with respect to a certain pixel corresponding to a certain of gray level pixel data in the gray level image data, correcting the certain of gray level pixel data by utilizing error diffusion coefficients for the pixels at the non-causal locations, the causal transformation errors and the non-causal transformation errors, and quantizing the corrected gray level pixel data.

According to still another aspect of the present invention, there is provided a non-causal error diffusion method wherein, in transforming digital image of great gray level sets into digital image of reduced gray level sets, the method comprises the steps of receiving the gray level digital image data, checking if a certain of gray level pixel data to be binarized remain in the gray level digital image data, calculating causal transformation errors for each pixel at causal locations with respect to a certain pixel corresponding to the certain of gray level pixel data, calculating non-causal transformation errors for each pixel at non-causal locations with respect to the certain pixel, correcting the certain of gray level pixel data by utilizing error diffusion coefficients for pixels at each location for the certain pixel, the causal transformation errors and the non-causal transformation errors, and quantizing the corrected gray level pixel data.

According to still another aspect of the present invention, there is provided a non-causal error diffusion apparatus wherein, in transforming digital image of great gray level sets into digital image of reduced gray level sets, transformation errors in a certain pixel are reflected to pixel data for pixels at non-causal locations that are adjacent to the certain pixel.

According to still another aspect of the present invention, there is provided a non-causal error diffusion apparatus wherein, in transforming digital image of great gray level sets into digital image of reduced gray level sets, the apparatus comprises input means for inputting the gray level image data, error detecting means for calculating non-causal transformation errors for each pixel at non-causal locations with respect to a certain pixel corresponding to a certain of gray level pixel data each time the certain of gray level pixel data are inputted from the input means, data control means for correcting the certain of gray level pixel data by utilizing error diffusion coefficients for the pixels at the non-causal locations, causal transformation errors and the non-causal transformation errors, and means for quantizing the corrected gray level pixel data from the data control means.

According to still another aspect of the present invention there is provided a non-causal error diffusion apparatus wherein, in transforming digital image of great gray level sets into digital image of reduced gray level sets, the apparatus comprises input means for inputting the gray level image data, means, responsive to a certain of gray level pixel data to be binarized from the input means, for calculating causal transformation errors for each pixel at causal locations with respect to a certain pixel corresponding to the certain of gray level pixel data, means, responsive to the certain of gray level pixel data to be binarized from the input means, for calculating non-causal transformation errors for each pixel at non-causal locations with respect to the certain pixel, data control means for correcting the certain of gray level pixel data by utilizing error diffusion coefficients for pixels at each location for the certain pixel, the causal transformation errors and the non-causal transformation errors, and means for quantizing the corrected gray level pixel data to generate the binary level pixel data.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1A:
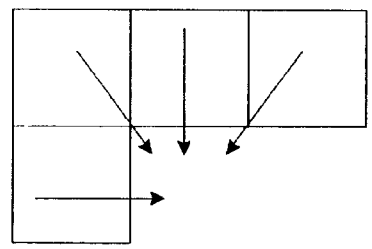
FIG. 1(A) to FIG. 1(F) show locations of neighboring pixels used in the conventional error diffusion techniques.
Figure 1B:
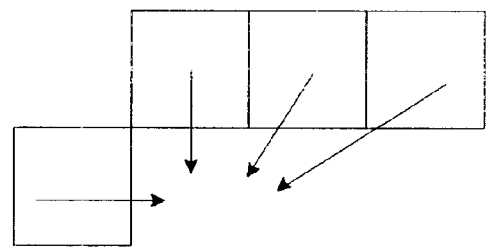
Figure 1C:
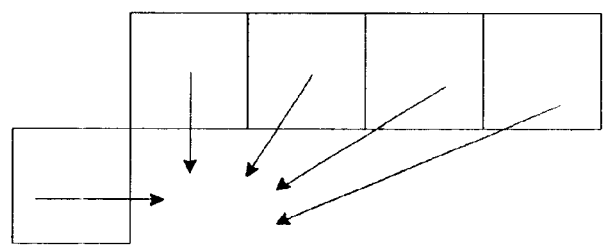
Figure 1D:
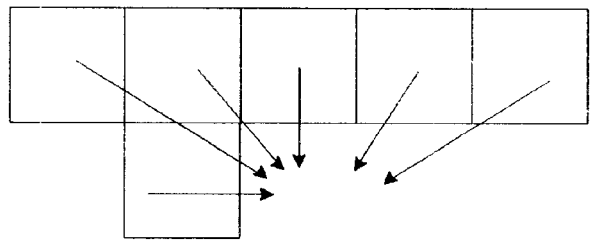
Figure 1E:
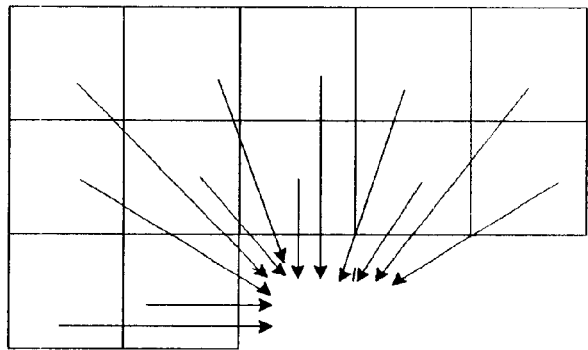
Figure 1F:
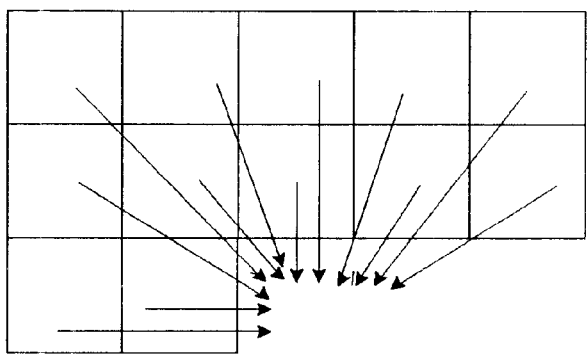
Figure 2:
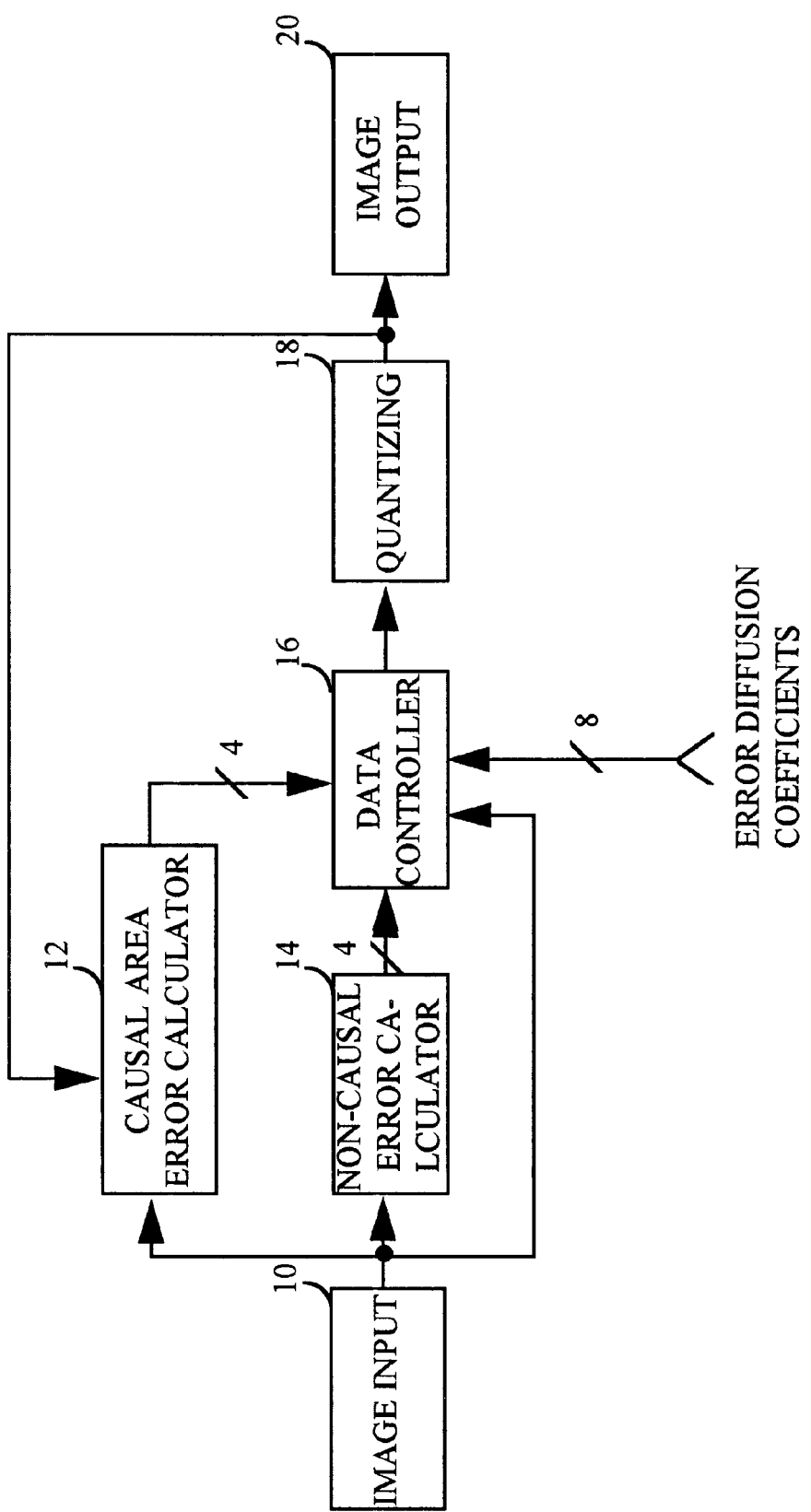
FIG. 2 is a schematic block diagram showing a configuration of a non-causal error diffusion apparatus according to an embodiment of the present invention.

Referring to FIG. 2, there is shown a non-causal error diffusion apparatus according to an embodiment of the present invention. The non-causal error diffusion apparatus includes an image input part 10 for receiving gray level image, a causal area error calculator 12 connected in parallel to the image input part 10, a non-causal area error calculator 14, and a data controller 16. The image input part 10 scans gray level image on a paper to convert the scanned gray level image into gray level pixel image signals that are in the form of electrical signals. To this end, the image input part 10 includes a scanner, a video camera and/or a page description language driver (PDLD). The gray level pixel image signals are commonly applied to a causal error calculator 12, a non-causal error calculator 14 and a data controller 16. The causal area calculator 12 calculates transformation error of pixel values with respect to surrounding pixels corresponding to each pixel value for each pixel value of gray level pixel signals, for example, three pixels on the upper side of (m, n) in FIG. 3, i.e., (m−1, n−1), (m, n−1) and (m+1, n−1) and one pixel (m−1, n) on the left side, that is, transformation error of pixel value for each pixel located in a causal area, which is hereinafter referred to as "causal area error". In other words, the causal area error calculator 12 generates four causal area transformation errors each time a single gray level pixel data is received from the image input part 10. These causal area errors occur by subtracting binary level pixel image data from gray level pixel image data. To this end, the causal area error calculator 12 includes a shift line for storing gray level pixel image data for (1 line+2) pixels from the image input part (10), a shift line for storing binary level pixel image data for (1 line+2) pixels fedback from a quantization part 18, and four subtractors for subtracting the corresponding pixel data on the two shift lines.

The non-causal area calculator 14 calculates transformation error of pixel values with respect to surrounding pixels corresponding to each pixel value for each pixel value of gray level pixel signals, for example, three pixels on the lower side of (m, n) in FIG. 3, i.e., (m−1, n+1), (m, n+1) and (m+1, n+1) and one pixel (m+1, n) on the right side, that is, transformation error of pixel values for each pixel located in a non-causal area, which is hereinafter referred to as "non-causal area error". In other words, the non-causal area error calculator 14 generates four non-causal area transformation errors each time a single gray level pixel data is received from the image input part 10. These non-causal area errors occur by subtracting binary level pixel image data from gray level pixel image data. To this end, the non-causal area error calculator 14 includes a pre-quantizer for previously converting gray level pixel image data into binary level pixel image data. Also, the non-causal area error calculator 14 includes a shift line for storing gray level pixel image data for (1 line+2) pixels from the image input part (10), a shift line for storing binary level pixel image data for (1 line+2) pixels fedback from the pre-quantizer, and four subtractors for subtracting the corresponding pixel data on the two shift lines.

The data controller 16 multiplies four causal area errors and four non-causal area errors by eight error diffusion coefficients, respectively, to control those error values, and thereafter adds the controlled error values to calculate a sum error value. Then, the data controller 16 subtracts pixel values to be binarized by the sum error value to correct the gray level pixel image data. Transformation error of pixel data for a certain pixel is diffused toward 8 surrounding pixels adjacent to the certain pixel by the data controller 16 performing such a data correction. In other words, when a pixel in the center (m, n) in FIG. 3 is binarized, the data controller 16 reflects the center (m, n) pixel upon transformation errors for pixels on the causal area including the upper (m−1, n−1), (m, n−1), and (m+1, n−1) pixels and the left (m−1, n) pixel that are adjacent to the center pixel, and upon transformation errors for pixels on the non-causal area including the lower (m−1, n+1), (m, n+1), and (m+1, n+1) pixels and the right (m+1, n) that are adjacent to the center pixel. To this end, the data controller 16 receives 8 error diffusion coefficients from the input line 11, as well as 4 causal area errors from the causal area error calculator 12 and 4 non-causal area errors from the non-causal area error calculator 14. The 8 error diffusion coefficients are fixed values, which are estimated from testing gray level pixel image data. Otherwise, the 8 error diffusion coefficients may be occasionally updated by the causal and non-causal area errors. In this case, a error diffusion factor updating part is additionally provided among the causal area error calculator 12, the non-causal area error calculator 14 and the data controller 16.

The non-causal error diffusing apparatus further includes a quantization part 18 and a printer 20 connected in series to the data controller 16. The data controller 16 receives 8 error diffusion coefficients from the input line 11, as well as 4 causal area errors from the causal area error calculator 12 and 4 non-causal area errors from the non-causal area error calculator 14. The quantization part 18 compares corrected gray level pixel image data from the data controller 16 with a threshold value and sets a value of "0" or "1" as pixel data based on the compared results, thereby transforming the corrected gray level pixel image data into binary level pixel image data. A gray level having the intermediate value in a set of gray levels of pixel image data is established as the threshold value. For example, when the gray level set of gray level pixel image data is 0 to 257, the threshold value becomes 127. The binary level pixel image data generated at the quantization part 18 is fedback into the causal area error calculator 12 and, at the same time, supplied to the image output part 20. The image output part 20 selectively displays spots on a screen or a printing paper in accordance with a value of binary level pixel image data.

Figure 3:
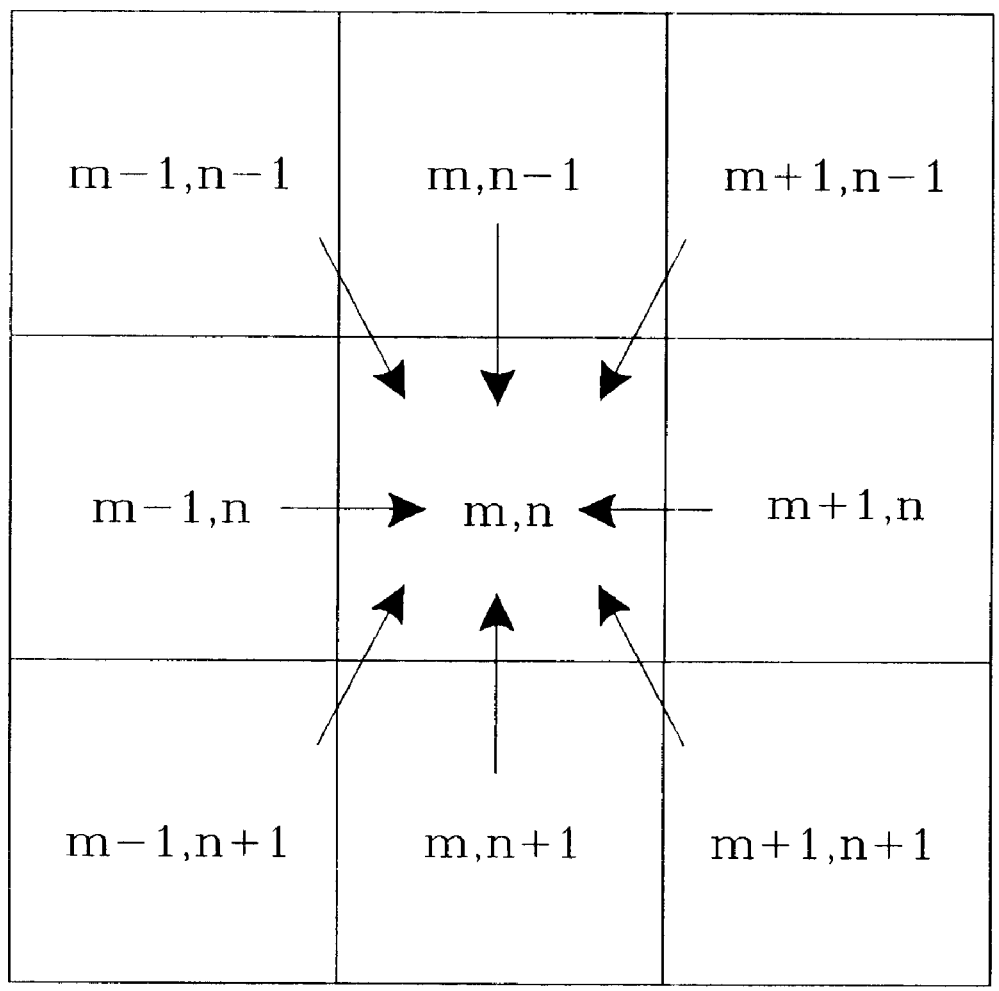
FIG. 3 shows surrounding pixels used in a non-casual error diffusion method according to an embodiment of the present invention.
Figure 4:
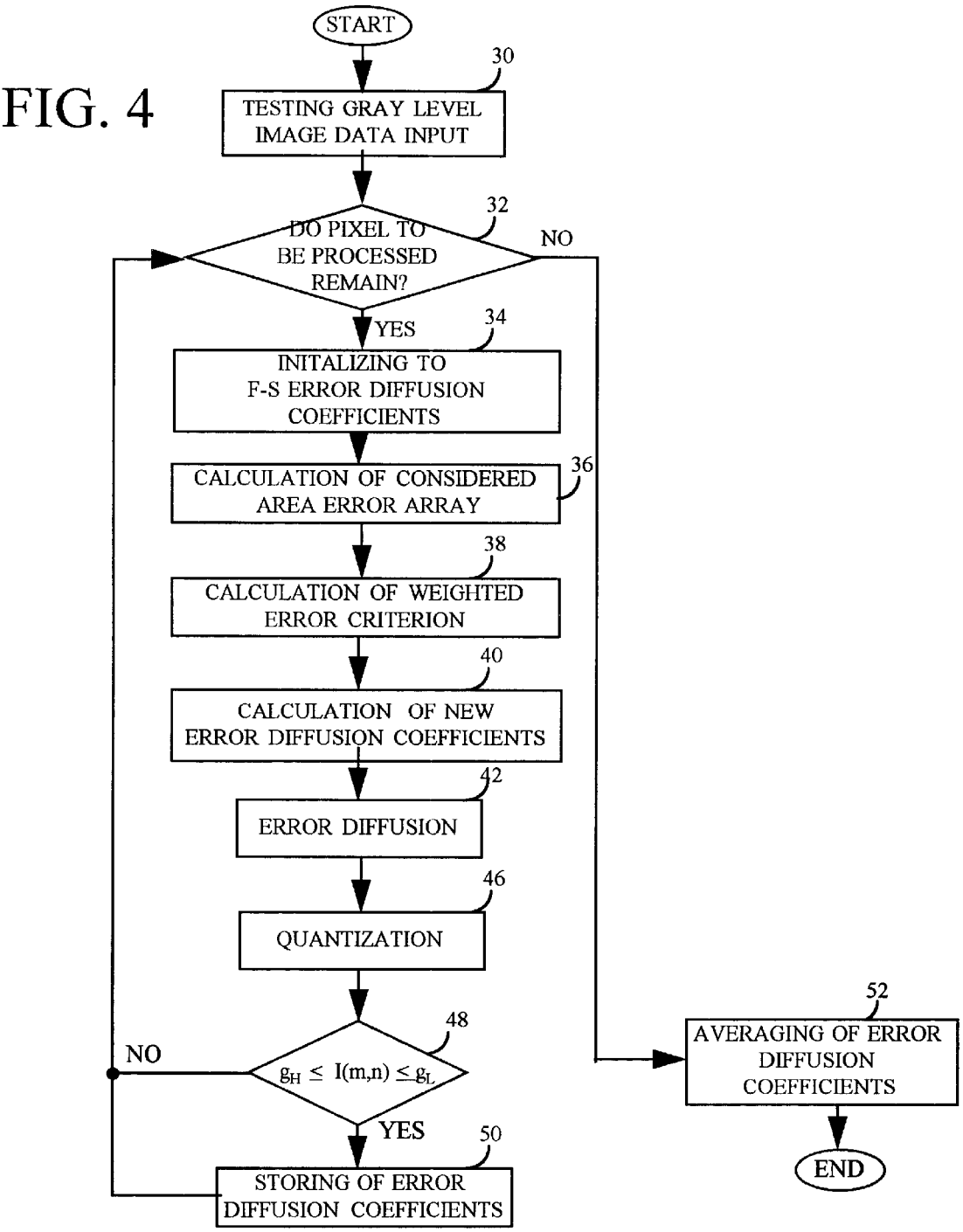
FIG. 4 is a flow chart showing an estimating process of an error diffusion coefficient used in an embodiment of the present invention.

FIG. 4 is a flow diagram for explaining a estimating process error diffusion coefficients to be used in the embodiment of FIG. 3, which can be performed by means of an arithmetic processing unit including image input means, e.g., a computer. Referring now to FIG. 4, testing gray level pixel image data I(m, n) for one field is inputted to the arithmetic processing unit in step 30. Continuous gray level lamp image is usually employed as the testing gray level pixel image, but other image may be used. Then, in step 32, the arithmetic processing unit determines whether or not pixel data to be processed exists.

If pixel data (m, n) to be processed exists in step 32, then the arithmetic processing unit set error diffusion coefficients on (m−1, n−1), (m, n−1), (m+1, n−1) and (m−1, n) pixels in the causal area for (m, n) pixel to Floyd-Steinberg's error diffusion coefficients, and sets all error diffusion coefficients on (m−1, n+1), (m, n+1), (m+1, n+1) and (m+1, n) pixels in the non-causal area for (m, n) pixel to "0", in step 34. Then, in step 36, the arithmetic processing unit calculates an error array including a difference between the gray level pixel data and the binary level pixel data for each of 3×3 area pixels, i.e., (m−1, n−1), (m, n−1), (m+1, n−1), (m−1, n), (m−1, n+1), (m, n+1), (m+1, n+1) and (m+1, n) pixels. Subsequently, the arithmetic processing unit calculates weighted error criterion values by the following equation:

$$\epsilon^2(m,n)=E[\{v(m,n)*(h(m,n)*b(m,n)-x(m,n))\}^2] \quad (1)$$

where x(m,n) is the (m,n)th pixel value of continuous gray level original image to be binarized; b(m,n) is the binarized pixel value; v(m,n) is the low pass filter defined for each gray level; and h(m,n) is another filter representing the human visual characteristics. Herein, the v(m,n) and v(m,n) was calculated to have the 3×3 size. In the above equation (1), the difference between the perceived binary image by human observer and the continuous gray level original image is weighted by the low pass filter v(m,n). Further, the perceived binary image by human observer is given a convolution with respect to the filter representing the human visual characteristics. Then, in step 40, the arithmetic processing unit multiplies the causal area errors contained in the error array and four non-causal area errors by new 8 error diffusion coefficients, respectively, and controls those error values, and thereafter adds the controlled error values to calculate a sum error value and then subtracts the sum error value from (m,n) gray level value to correct the (m,n) gray level pixel data. Transformation errors of pixel data for (m,n) pixel are diffused toward 8 surrounding pixels adjacent to the pixel.

The calculating procedures of new error diffusion coefficients in step 40 will be described in detail. First, the error defined by the following equation (2) is propagated into the surrounding pixels through the procedures in the following equation (3), and the determination of binary image is given through the following equation (4).

$$e(m, n) = h(m, n) * b(m, n) - x(m, n) \quad (2)$$

$$u(m, n) = x(m, n) - \sum_{(k,l) \in R} w(k, l)e(m - k, n - l) \quad (3)$$

-continued $$b(m, n) = \begin{vmatrix} 255 & u(m, n) \geq 128 \\ 0 & \text{otherwise} \end{vmatrix} \quad (4)$$

where w(k,l) are the error diffusion coefficients; and R represents the area in which the non-causal error diffusion coefficient is defined. In the case where the procedures in the above equations (2) to (4) are applied in order to apply the non-causal error diffusion coefficients to the error diffusion method, the non-causal area in which the binarization is not yet provided, is binarized with the binarized threshold value 128. The error is calculated by the above equation (2) employing the binarized value.

The procedures determining the error diffusion coefficients for the purpose of minimizing the weighted error defined by the above equation (1) will be described below. The weighted error criterion in the equation (1) can be expressed as the following equation (5) employing the equations (2) and (3).

$$\epsilon^2(m,n) = E[\{a(m,n)*(\delta(m,n)-w(m,n))\}^2] \quad (5)$$

where $$a(m,n) = v(m,n)*e(m,n) \quad (6)$$

where $\delta(m,n)$ denotes two dimensional delta function, and $a(m,n)$ is the convolution of the low pass filter for each gray level with respect to the errors.

In consideration of only the (m,n) pixel to be binarized, the above equation (5) can be rewritten as the following equations (7) to (9):

$$\varepsilon^2(m, n) = [a(m, n) * \{\delta(m, n) - w(m, n)\}]^2 \quad (7)$$

$$\varepsilon^2(m, n) = [a(m, n) - a(m - \tilde{k}, m - \tilde{l}) - \sum_{(k,l)=R-(\tilde{k},\tilde{l})} w_i(k, l)\{a(m - k, n - l) - a(m - \tilde{k}, n - \tilde{l})\}] \quad (8)$$

$$W^{new}(\tilde{k}, \tilde{l}) = 1 - \sum_{(k,l) \in R-(\tilde{k},\tilde{l})} w^{new}(k, l) \quad (9)$$

where $(\tilde{k}, \tilde{l})$ is the location selected optionally in the 3×3 areas. The above equation (9) is a procedure that allows the sum of coefficients to be the unity "1". In order to minimize the weighted error criterion evaluated by the equation (8), the changing procedures of error diffusion coefficients are calculated using the following equations (10) to (12):

$$W^{new}(k, l) = W^{old}(k, l) - \mu^{x(m,n)} \frac{\partial \varepsilon(m, n)}{\partial W^{old}(k, l)}, \quad (10)$$

$$(k, l) \in R - (\tilde{k}, \tilde{l})$$

$$\frac{\partial \varepsilon(m, n)}{\partial W^{old}(k, l)} = -2\{a(m - k, n - l) - a(m - \tilde{k}, \tilde{l})\}\varepsilon(m, n) \quad (11)$$

$$\mu^{x(m,n)} = C \cdot \exp(x(m, n)/255) \quad (12)$$

The above equation (11) is repeated until a certain number of stopping criterion or a predetermined stopping criterion is satisfied. In the equation (12), $\mu^{x(m,n)}$ has different values depending upon the values of input image x(m,n), and C is a constant.

After performing the step 42, the arithmetic processing unit compares the corrected gray level pixel image data with the threshold value, e.g., 127, and sets a value of "0" or "1" as pixel data in accordance with the compared results, thereby transforming the corrected gray level pixel image data into the binary level pixel image data in step 44. Then, in step 46, the arithmetic processing apparatus determines whether or not the difference value between the gray level pixel data and the binary level pixel data for (m,n) pixel falls in a predetermined range, that is, between lower limit level $g_L$ lower than the threshold value by a certain level and upper limit level $g_H$ higher than the threshold value by a certain level. If the difference value between the gray level pixel data and the binary level pixel data for (m,n) pixel falls in the predetermined range in step 48, then the arithmetic processing unit store 8 new error diffusion coefficients into the memory in step 48.

On the other hand, if there is no pixel to be processed in step 32, then the arithmetic processing unit calculates an average value of error diffusion coefficients for each location stored in the memory and sets the average value as 8 error diffusion coefficients in step 50. The 8 error diffusion coefficients set in this manner is supplied to the data controller 16 in FIG. 2.

The error diffusion coefficients calculated by the error diffusion coefficient estimating process as described with reference to FIG. 4 eliminates a visual correlated patterns emerging in the vicinity of 128 level in a set of gray levels. The occurrence of visual correlated pattern is caused by a fact that, since a probability making the binary image in a certain frequency is high when the binary threshold value fixed into 128 level is used, the energy of binary image is limited into the certain frequency.

Figure 5A:
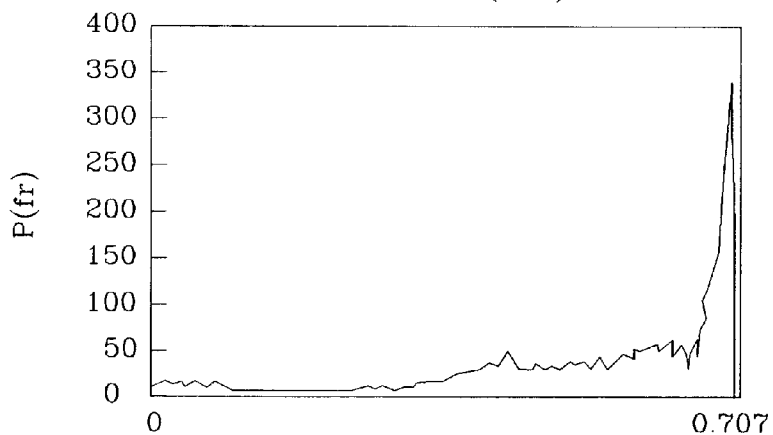
FIG. 5(A) to FIG. 5(c) illustrate radial power spectra in various gray levels.
Figure 5B:
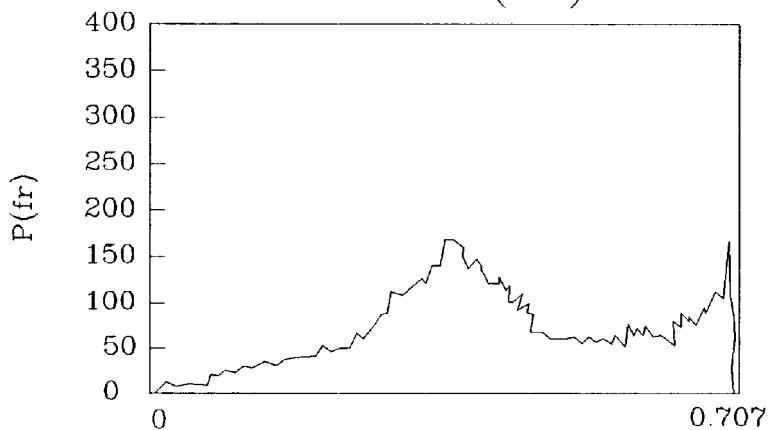
Figure 5C:
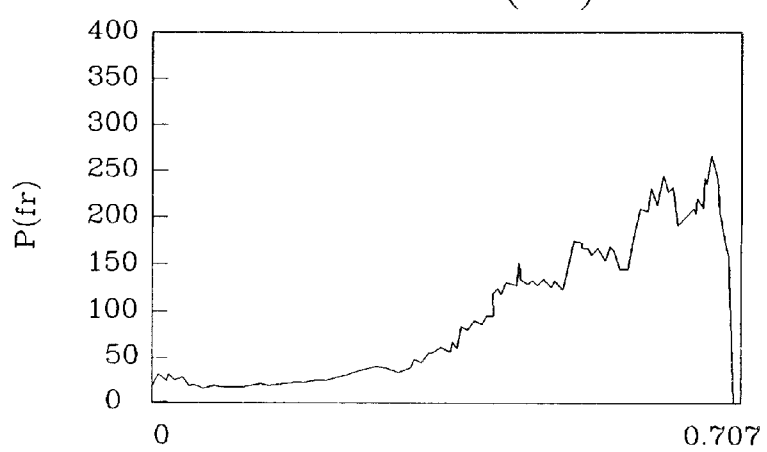

FIG. 5(A) to FIG. 5(C) shows radial power spectra in various gray levels. Specifically, FIG. 5(A) represents a radial power spectrum in 128 level; FIG. 5(B) does a radial power spectrum in 32 level; and FIG. 5(C) does a radial power spectrum in 64. As seen from the drawings, the energy relatively concentrates upon the specific frequency in the case of 128 level when compared with other level cases. This energy concentration problem is solved by making an average of the error diffusion coefficients when the transformation errors falls in a certain range, for example, in a range of 120 level to 130 level.

The error diffusion coefficients calculated in the above manner are as follows:

$$\begin{vmatrix} 0.8032 & 5.1240 & 2.8723 \\ 7.1221 & * & 0.1979 \\ -0.668 & -0.668 & 0.1651 \end{vmatrix}$$

Figure 6:
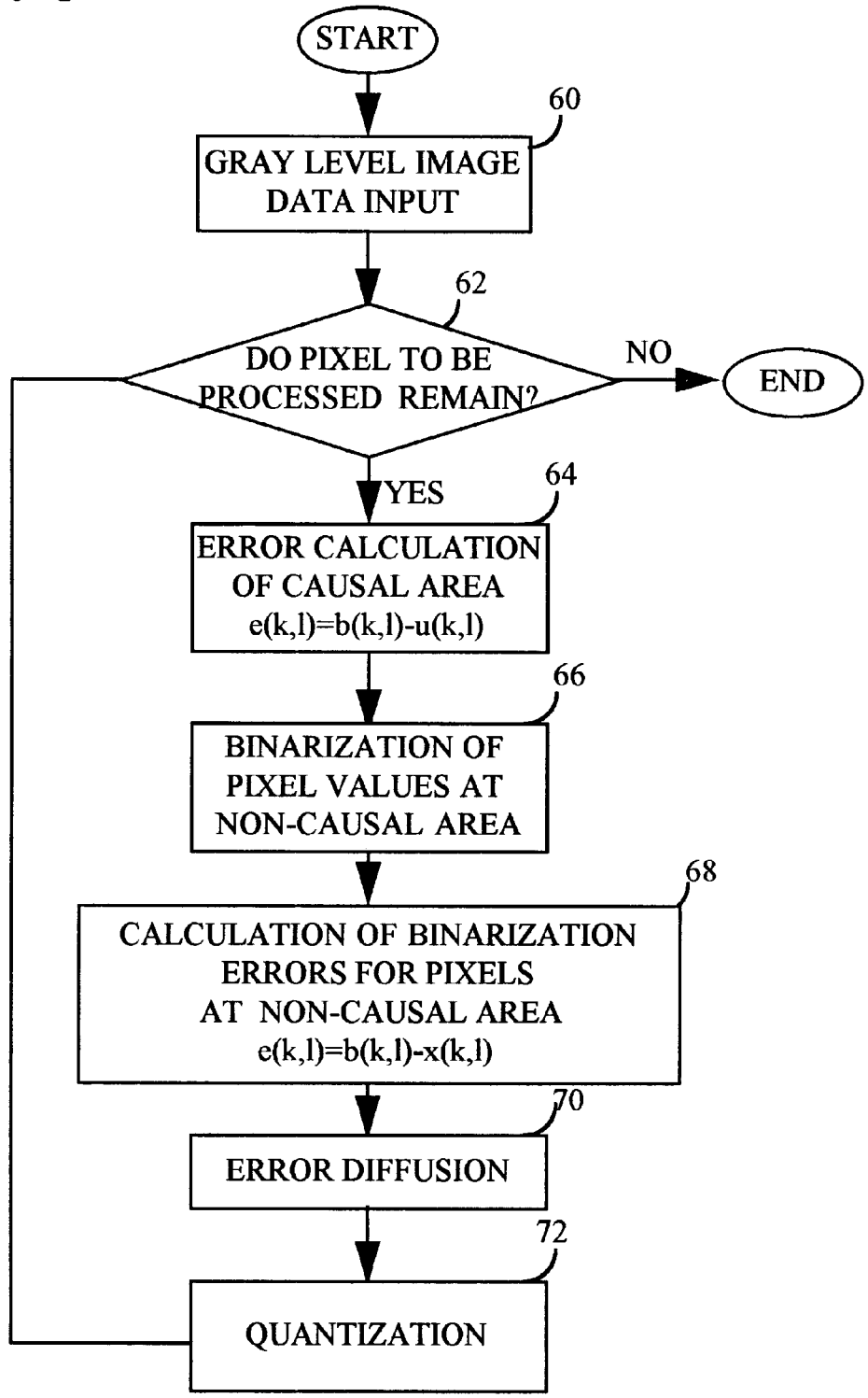
FIG. 6 is a flow chart for explaining a non-causal error diffusion procedures according to an embodiment of the present invention.

FIG. 6 is a flow diagram for explaining the transformation process of gray level pixel image data into binary level pixel image data employing the error diffusion coefficients as determined above, which can be processed by means of an arithmetic processing unit having input means for receiving gray level pixel image, for example, a computer.

Referring now to FIG. 6, gray level pixel image data for one field is inputted to the arithmetic processing unit in step 60. Then, in step 62, the arithmetic processing unit determines whether or not gray level pixel data to be binarized remain.

If gray level pixel data (m,n) to be binarized remain in step 62, then the arithmetic processing unit subtracts the binary level pixel data from gray level pixel data for each of the upper (m−1,n−1), (m,n−1) and (m+1,n−1) pixels and the left (m−1,n) that are adjacent to the (m,n) pixel, thereby calculating 4 errors for (m−1,n−1), (m,n−1), (m+1,n−1), and (m−1,n) pixels in a causal area for the (m,n) pixel in step 64.

Subsequently, in step 66, the arithmetic processing unit compares gray level pixel data for each of the lower (m−1, n+1), (m,n+1) and (m+1,n+1) pixels and the right (m+1,n) pixel that are adjacent to the (m,n) pixel with the threshold value, and sets a value of "0" or "1" as pixel data based on the compared results, thereby transforming the gray level pixel data in the non-causal area for the (m,n) pixel into the binary level pixel data. Then, in step 68, the arithmetic processing unit subtracts the binary level pixel data from gray level pixel data for each of the lower (m−1,n+1), (m,n+1) and (m+1,n+1) pixels and the right (m+1,n) that are adjacent to the (m,n) pixel, thereby calculating 4 errors for (m−1,n+1), (m,n+1), (m+1,n+1), and (m+1,n) pixels in a non-causal area for the (m,n) pixel.

After performing the step 68, the arithmetic processing unit multiplies the 4 causal area errors and the 4 non-causal area errors by 8 error diffusion coefficients, respectively, to control those error values, and thereafter adds the controlled error values to calculate a sum error value and subtracts the sum error value from (m,n) pixel value to be binarized, thereby correcting gray level pixel image data for the (m,n) pixel in step 70. The transformation error of pixel data for a certain pixel is diffused toward 8 surrounding pixels adjacent to the certain pixel by this data correction. In other words, when (m,n) pixel is binarized, both the transformation errors for the causal area pixels including the upper (m−1,n−1), (m,n−1) and (m+1,n−1) pixels and the left (m−1,n) pixel that are adjacent to the (m,n) pixel and the transformation errors for the non-causal area pixels including the lower (m−1,n+1), (m,n+1) and (m+1,n+1) pixels and the right (m+1,n) pixel that are adjacent to the (m,n) pixel, are reflected to the (m,n) pixel. Subsequently, in step 72, the arithmetic processing unit compares the corrected gray level pixel image data with a threshold value and sets a value of "0" or "1" as pixel data based on the compared results, thereby transforming the corrected gray level pixel image data into binary level pixel image data. A gray level having the intermediate value in a set of gray levels of pixel image data is established as the threshold value. For example, when the gray level set of gray level pixel image data is 0 to 257, the threshold value becomes 127. The binary level pixel image data transformed in the above manner are displayed on a screen or a printing paper in the form of spots by the image output part to reproduce the image.

Hereinafter, experiments for the error diffusion method according to the present invention will be described.

Figure 7A:
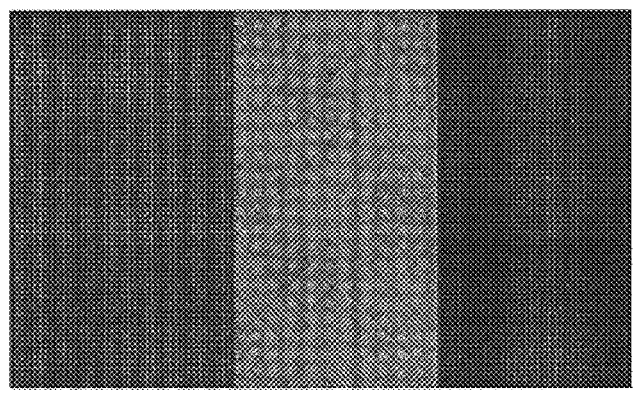
FIG. 7(A) shows pulse image of gray levels for edge line reproducing experiment.
Figure 7B:
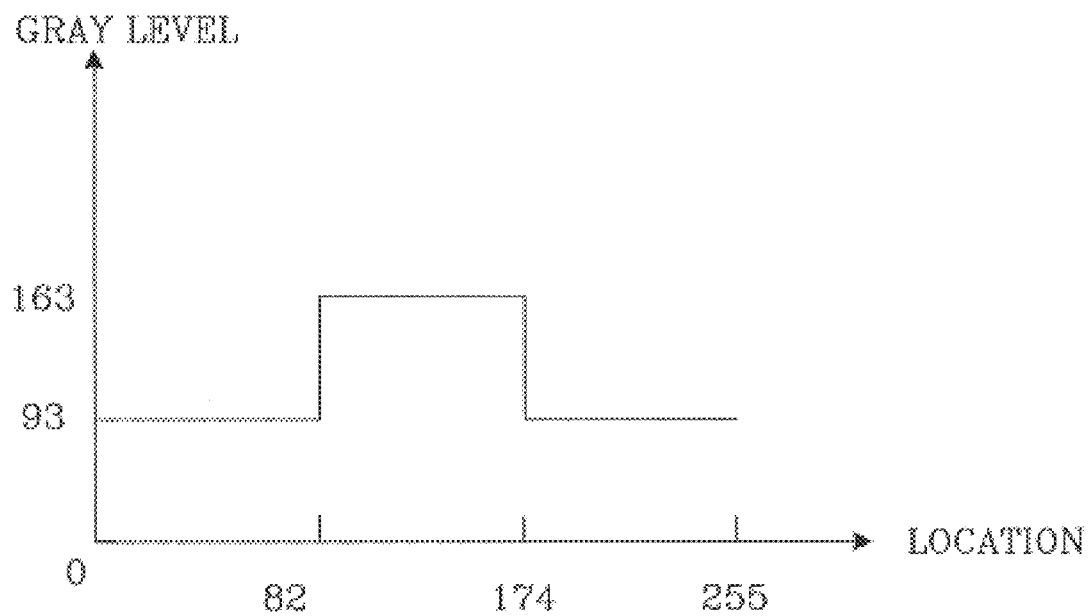
FIG. 7(B) shows a changing state of gray levels in the horizontal axis with respect to the pulse image in FIG. 7(A)
Figure 8A:
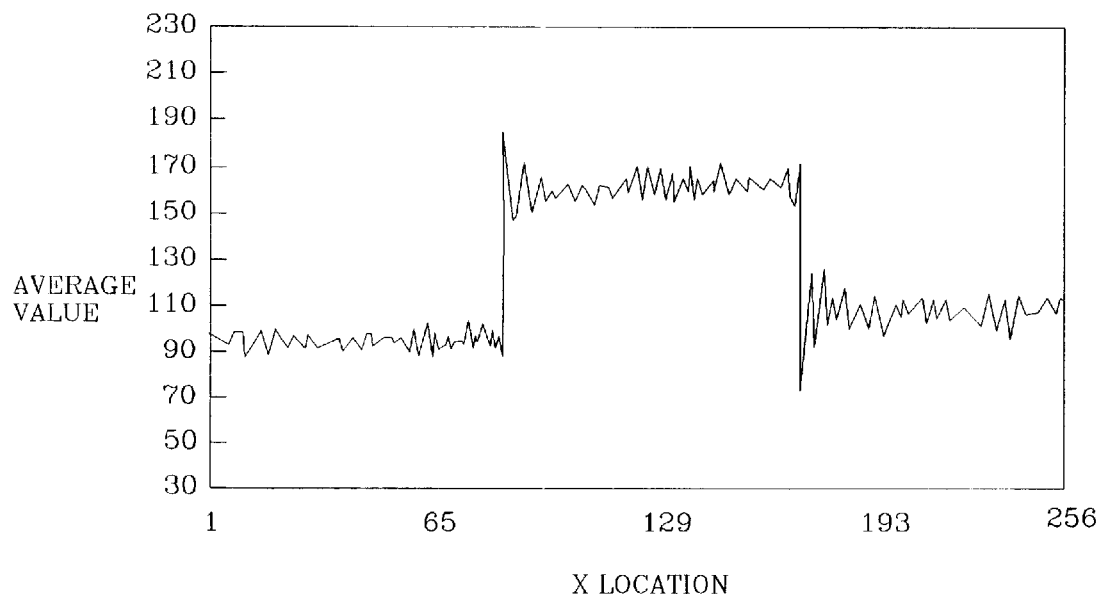
FIG. 8(A) shows a response characteristic in the conventional error diffusion technique with respect to FIG. 7(A)
Figure 8B:
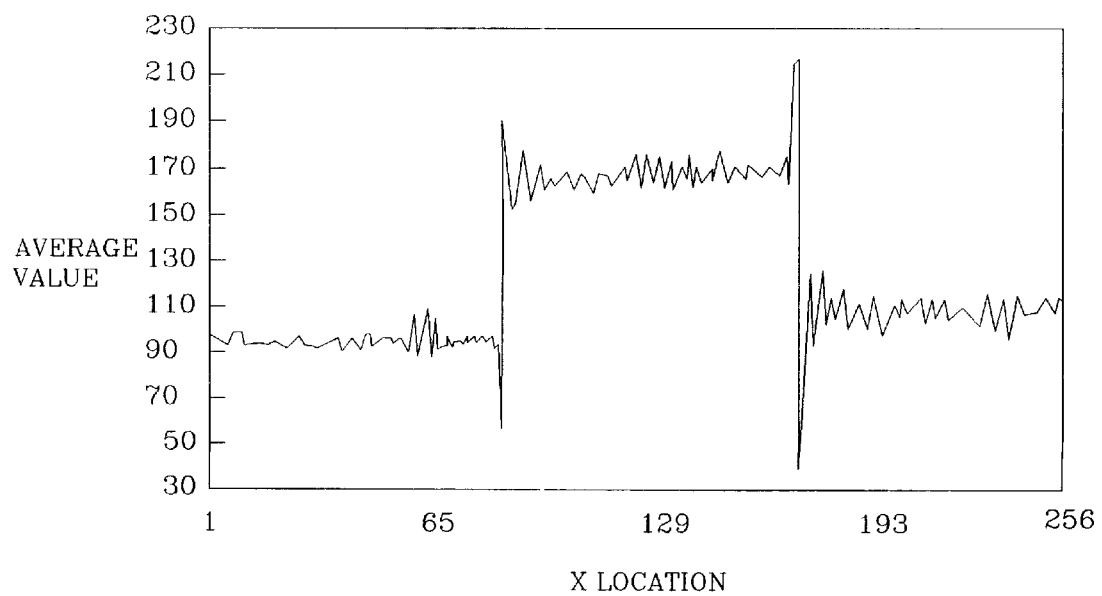
FIG. 8(B) shows a response characteristic in the non-causal error diffusion method according to the present invention with respect to the pulse image in FIG. 7(A)

With respect to the image as shown in FIG. 7(A), the gray level in the horizontal axis is transformed into a shape of pulse as shown in FIG. 7(B). In the binary level image obtained by transforming the gray level pixel image data of FIG. 7(A) using the conventional error diffusion method, its gray level changes in the horizontal axis as shown in FIG. 8(A). On the other hand, in the binary level image obtained by transforming the gray level pixel image data of FIG. 7(A) using a non-causal error diffusion method according to the present invention, its gray level changes in the horizontal axis as shown in FIG. 8(B). As seen from FIG. 8(A) and FIG. 8(B), the binary level image transformed by the non-casual error diffusion method according to the present invention is emphasized in its boundary lines compared with the binary level image transformed by the conventional error diffusion method.

Figure 9A:
FIG. 9(A) shows Rena's image binarized using the Floyde-Steinberg's error diffusion method.
Figure 9B:
FIG. 9(B) shows Rena's image binarized using an error diffusion method according to the present invention.

FIG. 9(A) and FIG. 9(B) shows states in which Rena's image of size 512×512, utilized as a sample image in the experiments, is transformed using the conventional Floyd-Steinberg error diffusion method and the non-causal error diffusion method, and then printed in a printing resolution of 150 dpi, respectively. In the Rena's image of FIG. 9(A) binarized by the Floyd-Steinberg error diffusion method, much artifacts exist in her face portion, her shoulder portion and the glass portion, etc.; while in the Rena's image of FIG. 9(B) binarized by the non-causal error diffusion method according to the present invention, artifacts do not almost exist in those portions.

Figure 10:
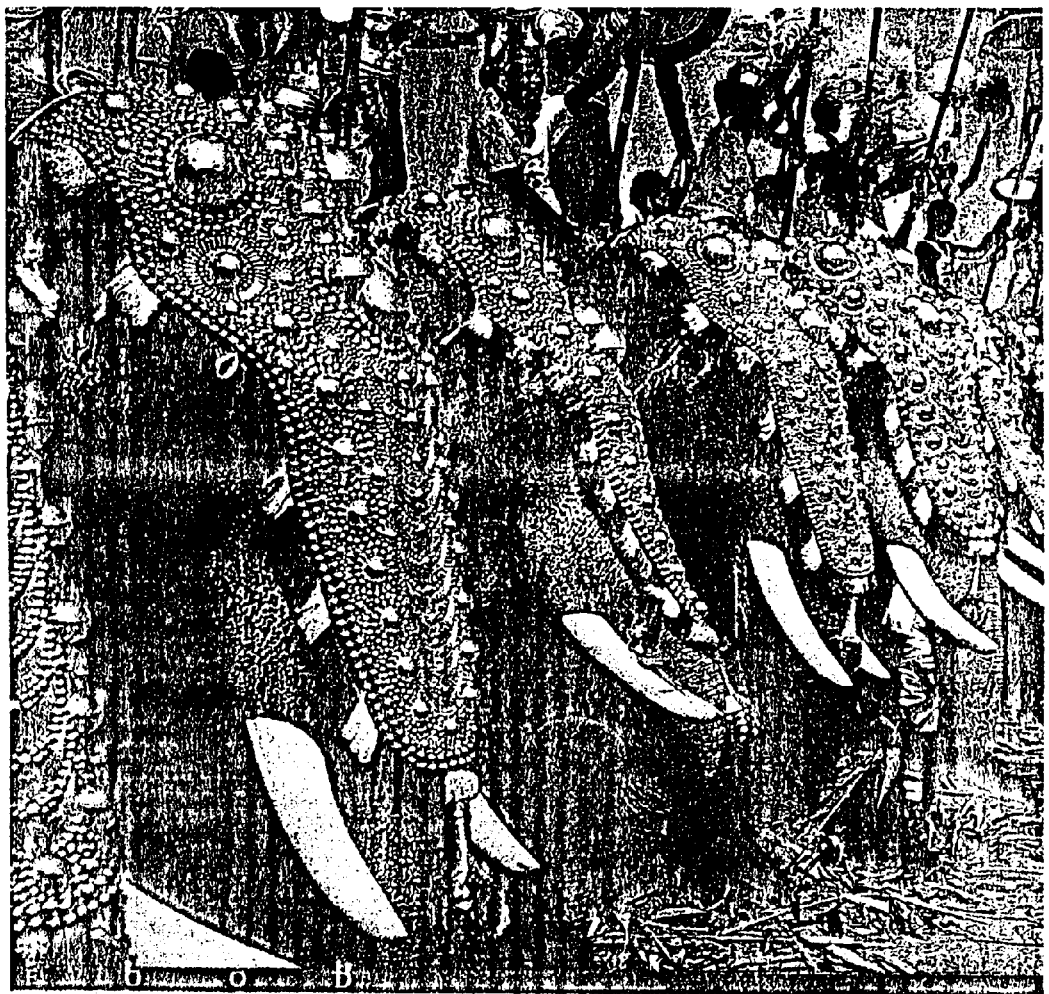
FIG. 10 shows a state in which hardcopied image is binarized using an error diffusion method according to the present invention.

FIG. 10 shows a state in which the hardcopy image of gray levels is scanned in a resolution of 300 dpi and then binarized by the non-causal error diffusion technique according to the present invention, and, thereafter, the binarized hardcopy image is printed in a resolution of 300 dpi.

As can be seen from the above experiments, in a non-causal error diffusion method and apparatus according to the present invention, since the transformation errors for each pixel at the non-causal locations are reflected in transforming great gray level sets of digital image into reduced gray level sets of digital image, the boundary lines are conspicuously emphasized and artifacts is dramatically reduced.

As described above, in a non-causal error diffusion method and apparatus according to the present invention, both the transformation errors for the causal pixels and the transformation errors for the non-causal pixels are reflected to the binarization of gray level pixel image data, so that the boundary portions in the binarized image can be conspicuously emphasized and artifacts can be dramatically reduced. As a result, the non-causal error diffusion method and apparatus according to the present invention is capable of preventing the deterioration of picture quality when the gray level image is changed into the binary level image.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A non-causal error diffusion method wherein, in transforming digital image of great gray level sets into digital image of reduced gray level sets, the method comprises the steps of:

calculating non-causal transformation errors for each pixel at non-causal locations with respect to a certain pixel corresponding to a certain of gray level pixel data in the gray level image data;

correcting the certain of gray level pixel data by utilizing error diffusion coefficients for the pixels at the non-causal locations, the causal transformation errors and the non-causal transformation errors; and quantizing the corrected gray level pixel data.

2. The non-causal error diffusion method as claimed in claim 1, wherein the quantizing step includes calculating the corrected pixel data by applying the error diffusion coefficients, the transformation errors and the pixel data for the certain pixel to the following equations:

$$e(m, n) = h(m, n) * b(m, n) - x(m, n) \tag{1}$$

$$u(m, n) = x(m, n) - \sum_{(k,l) \in R} w(k, l) e(m - k, n - l)$$

$$b(m, n) = \begin{vmatrix} 255 & u(m, n) \geq 128 \\ 0 & \text{otherwise} \end{vmatrix}$$

where e(m,n) are transformation errors for the pixels at the non-causal locations; h(m,n) are filtering values representing the human visual characteristics; b(m,n) are binary level pixel data for pixels at the causal and non-causal locations; x(m,n) are a certain of gray level pixel data to be binarized;

w(k,l) are error diffusion coefficients for each non-causal location; R is an area in which the non-causal error diffusion coefficients are defined; and u(m,n) are the corrected certain gray level pixel data.

3. A non-causal error diffusion method wherein, in transforming digital image of great gray level sets into digital image of reduced gray level sets, the method comprises the steps of:

receiving the gray level digital image data;

checking if a certain of gray level pixel data to be binarized remain in the gray level digital image data;

calculating causal transformation errors for each pixel at causal locations with respect to a certain pixel corresponding to the certain of gray level pixel data;

calculating non-causal transformation errors for each pixel at non-causal locations with respect to the certain pixel;

correcting the certain of gray level pixel data by utilizing error diffusion coefficients for pixels at each location for the certain pixel, the causal transformation errors and the non-causal transformation errors; and quantizing the corrected gray level pixel data.

4. The non-causal error diffusion method as claimed in claim 3, wherein the quantizing step includes calculating the corrected pixel data by applying the error diffusion coefficients, the transformation errors and the pixel data for the certain pixel to the following equations:

$$e(m, n) = h(m, n) * b(m, n) - x(m, n) \quad (2)$$

$$u(m, n) = x(m, n) - \sum_{(k,l) \in R} w(k, l) e(m - k, n - l)$$

$$b(m, n) = \begin{vmatrix} 255 & u(m, n) \geq 128 \\ 0 & \text{otherwise} \end{vmatrix}$$

where e(m,n) are transformation errors for the pixels at the non-causal locations; h(m,n) are filtering values representing the human visual characteristics; b(m,n) are binary level pixel data for pixels at the causal and non-causal locations; x(m,n) are a certain of gray level pixel data to be binarized; w(k,l) are error diffusion coefficients for each non-causal location; R is an area in which the non-causal error diffusion coefficients are defined; and u(m,n) are the corrected certain gray level pixel data.

5. The non-causal error diffusion method as claimed in claim 3, wherein the error diffusion coefficients are produced by performing the steps of:

(A) inputting testing gray level image data;

(B) checking if a certain of gray level pixel data to be binarized remain in the testing gray level image data;

(C) if the certain of gray level pixel data to be binarized remain in the (B) step, then giving virtual diffusion coefficients having predetermined different values to pixels at the causal locations for a certain pixel corresponding to the certain of gray level pixel data, and giving virtual error diffusion coefficients having specific values to pixels at the non-causal locations;

(D) calculating a transformation error array including the transformation errors for each of the pixels at the causal locations and the pixels at the non-causal locations;

(E) calculating weighted criterion errors by employing the transformation error array;

(F) controlling the virtual error diffusion coefficients to optimize the weighted criterion errors and generating the controlled virtual error diffusion coefficients;

(G) storing the controlled virtual error diffusion coefficients to a memory; and (H) if a certain of gray level pixel data remain in the (B) step, then making an average for each location of the controlled virtual error diffusion coefficients stored into the memory.

6. The non-causal error diffusion method as claimed in claim 5, wherein the (G) step includes the steps of:

correcting the certain of gray level pixel data by utilizing the controlled virtual error diffusion coefficients and the transformation error array;

quantizing the corrected certain gray level pixel data to produce the binary level pixel data for the certain pixel;

determining whether or not a difference between the corrected certain gray level pixel data and the binary level pixel data for the certain pixel falls in a certain range; and if the difference between the two pixel data falls in the certain range, then storing the controlled virtual error diffusion coefficients into the memory.

7. A non-causal error diffusion apparatus wherein, in transforming digital image of great gray level sets into digital image of reduced gray level sets, the apparatus comprises:

input means for inputting the gray level image data;

error detecting means for calculating non-causal transformation errors for each pixel at non-causal locations with respect to a certain pixel corresponding to a certain of gray level pixel data each time the certain of gray level pixel data are inputted from the input means;

data control means for correcting the certain of gray level pixel data by utilizing error diffusion coefficients for the pixels at the non-causal locations, causal transformation errors and the non-causal transformation errors; and means for quantizing the corrected gray level pixel data from the data control means.

8. A non-causal error diffusion apparatus wherein, in transforming digital image of great gray level sets into digital image of reduced gray level sets, the apparatus comprises:

input means for inputting the gray level image data;

means, responsive to a certain of gray level pixel data to be binarized from the input means, for calculating causal transformation errors for each pixel at causal locations with respect to a certain pixel corresponding to the certain of gray level pixel data;

means, responsive to the certain of gray level pixel data to be binarized from the input means, for calculating non-causal transformation errors for each pixel at non-causal locations with respect to the certain pixel;

data control means for correcting the certain of gray level pixel data by utilizing error diffusion coefficients for pixels at each location for the certain pixel, the causal transformation errors and the non-causal transformation errors; and means for quantizing the corrected gray level pixel data to generate the binary level pixel data.

* * * * *